(12) United States Patent
Abuelsaad et al.

(10) Patent No.: US 8,904,508 B2
(45) Date of Patent: Dec. 2, 2014

(54) SYSTEM AND METHOD FOR REAL TIME SECURE IMAGE BASED KEY GENERATION USING PARTIAL POLYGONS ASSEMBLED INTO A MASTER COMPOSITE IMAGE

(71) Applicant: International Business Machines Corporation, Armonk, NY (US)

(72) Inventors: Tamer E. Abuelsaad, Somers, NY (US); William K. Bodin, Austin, TX (US); David Jaramillo, Lake Worth, FL (US); Nader M. Nassar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/624,020

(22) Filed: Sep. 21, 2012

(65) Prior Publication Data

US 2014/0090032 A1    Mar. 27, 2014

(51) Int. Cl.
*H04L 29/06* (2006.01)
*H04L 12/28* (2006.01)

(52) U.S. Cl.
CPC ......... *H04L 63/0823* (2013.01); *H04L 12/2809* (2013.01)
USPC .......................................................... 726/7

(58) Field of Classification Search
CPC .. G06K 9/986; G06K 19/6028; H04W 12/06; H04L 63/0823; H04L 12/2809
USPC .......................................................... 726/5, 7
See application file for complete search history.

(56) References Cited

U.S. PATENT DOCUMENTS

| | | | |
|---|---|---|---|
| 2007/0253592 A1 | 11/2007 | Sun et al. | |
| 2007/0277224 A1 | 11/2007 | Osborn et al. | |
| 2007/0277227 A1 * | 11/2007 | Brendel | 726/3 |
| 2008/0101723 A1 * | 5/2008 | Kansal | 382/284 |
| 2008/0310673 A1 * | 12/2008 | Petrovic et al. | 382/100 |
| 2009/0144829 A1 | 6/2009 | Grigsby et al. | |
| 2009/0228707 A1 | 9/2009 | Linsky | |
| 2010/0082998 A1 | 4/2010 | Kohavi | |
| 2012/0005483 A1 | 1/2012 | Patvarczki et al. | |
| 2013/0222835 A1 * | 8/2013 | Iwamoto et al. | 358/1.14 |

* cited by examiner

*Primary Examiner* — Hadi Armouche
*Assistant Examiner* — Dao Ho
(74) *Attorney, Agent, or Firm* — F. Chau & Associates, LLC (57) ABSTRACT

A method including: receiving, at a first device, a challenge provided from a second device, wherein the challenge includes an encoding algorithm and a request for credentials from the first device; and outputting, from the first device to the second device, a response to the challenge, wherein the response includes at least one image, the at least one image including an article of evidence arranged according to the encoding algorithm.

16 Claims, 7 Drawing Sheets

FIG. 1

Image A

Image B

Image C

Image D

Composite Image

Descriptor/Manifest Image

Image A

Image B

Image C

Image D

Composite Image

SYSTEM AND METHOD FOR REAL TIME SECURE IMAGE BASED KEY GENERATION USING PARTIAL POLYGONS ASSEMBLED INTO A MASTER COMPOSITE IMAGE

BACKGROUND

1. Technical Field

The present invention relates to electronic authentication.

2. Discussion of the Related Art

Authentication using mobile devices is a growing commodity. However, using a set of challenges like pre-defined passwords or pin numbers introduces a risk of compromising the integrity of the authentication process. From badge readers, to financial transactions based on near field communication, the risk of presenting a static/pre-defined set of credentials is part of the problem, not part of the solution. For example, if a badge has to present the same code to a reader, a mobile device has to present the same set of credentials (e.g., password, PIN number, etc.) to complete a transaction, or a credit card has the same information stored in a magnetic field, hackers may find ways to break into these static vaults and acquire credentials.

BRIEF SUMMARY

The present invention discloses a system and method for generating a master key and subsequent images which contain a combination of meaningful and non-meaningful information. The master key image contains a list of meaningful polygons (or other descriptors) which allow the reader of the these transmitted images to assemble a virtual aggregate key. The resultant key is therefore never transmitted but is rather assembled dynamically from the sequence of images.

In an exemplary embodiment of the present invention, the method includes: receiving, at a first device, a challenge provided from a second device, wherein the challenge includes an encoding algorithm and a request for credentials from the first device; and outputting, from the first device to the second device, a response to the challenge, wherein the response includes at least one image, the at least one image including an article of evidence arranged according to the encoding algorithm.

The encoding algorithm identifies where the article of evidence is to be positioned in the at least one image.

The article of evidence is included within a polygon in the at least one image.

The at least one image includes a bar code.

The first device includes a mobile device.

The second device includes a server.

The method further comprises: authenticating the first device in response to the challenge response; and permitting the first device to access a desired resource in response to the authentication of the first device, wherein the authenticating and permitting are performed using the second device.

The first device or the second device is a program or a virtual device.

The at least one image includes a quick response code.

In an exemplary embodiment of the present invention, the method includes: receiving, at a first device, a challenge from a second device, wherein the challenge includes a request for credentials from the first device; and outputting, from the first device to the second device, a response to the challenge, wherein the response includes an encoding algorithm and at least one image that includes an article of evidence arranged according to the encoding algorithm.

The encoding algorithm is included in an image.

The method further comprises extracting, at the second device, the article of evidence from the at least one image according to the encoding algorithm.

In an exemplary embodiment of the present invention, the method includes: receiving, at a first device, a challenge request from a second device, wherein the challenge request includes a request for credentials from the first device and an identification of areas where the credentials are to be included in images; generating, with the first device, a plurality of images, wherein at least one image includes at least one article of evidence indicative of at least one of the credentials, and the at least one article of evidence is arranged in the image as indicated by the area corresponding thereto; providing, from the first device, the plurality of images as a composite image to the second device; providing the composite image to a third device from the second device; and validating, at the third device, the first device using the composite image.

Prior to the challenge request being sent to the first device from the second device, the challenge request is generated in the third device and provided to the second device based on an initial communication between the first and second devices.

The first device includes a mobile device, the second device includes a validator and the third device includes a server.

In an exemplary embodiment of the present invention, the method includes receiving, at a first device, a challenge request from a second device, wherein the challenge request includes a request for credentials from the first device; generating, with the first device, a plurality of images, wherein each image includes at least one article of evidence indicative of at least one of the credentials, and the at least one article of evidence is arranged in the image according to an encoding algorithm; providing, the plurality of images as a composite image to a third device; and providing the composite image to the second device from the third device.

The first device includes a mobile device, the second device includes a server and the third device includes a validator.

DETAILED DESCRIPTION

The invention disclosed herein introduces two main concepts that work in concert to provide the needed level of security to ensure a random and unique authentication process.

First, the invention elevates the security challenge to be dynamic and not stored on a mobile device. For example, the server generates a new challenge and provides it to the mobile device. An application/logic layer in the mobile device will respond and stream the challenge response. Then, resource access is granted by the server, e.g., meaning authentication completion. As a result, predicting the type of challenge and the outcome of that challenge is virtually impossible.

Second, the invention minimizes identity theft as an identity is represented as a series of articles that are dependant on one another. Getting a hold of any single article is useless. Getting a hold of all of them without knowing how to assemble them is useless as well.

In accordance with exemplary embodiments of the present invention, a mobile device may be a smart phone, a tablet, a laptop, a smart card, for example, a validator may be a badge reader, a credit card reader, a proxy server, for example, and the server may be cloud based, for example. The validator may also be a program in the cloud. Further, a non-portable compute device may be used in place of the mobile device. Further, the mobile device, validator and server may be a program or a virtual device.

In accordance with exemplary embodiments of the present invention, a requested resource may be access to a protected room, access to a digital file, access to email, or access to any other digital or physical assets, for example.

A method in accordance with an exemplary embodiment of the present invention will now be discussed. More particularly, a method for authentication between a mobile device and a server is disclosed hereafter with reference to FIGS. 1 and 2.

Figure 1:
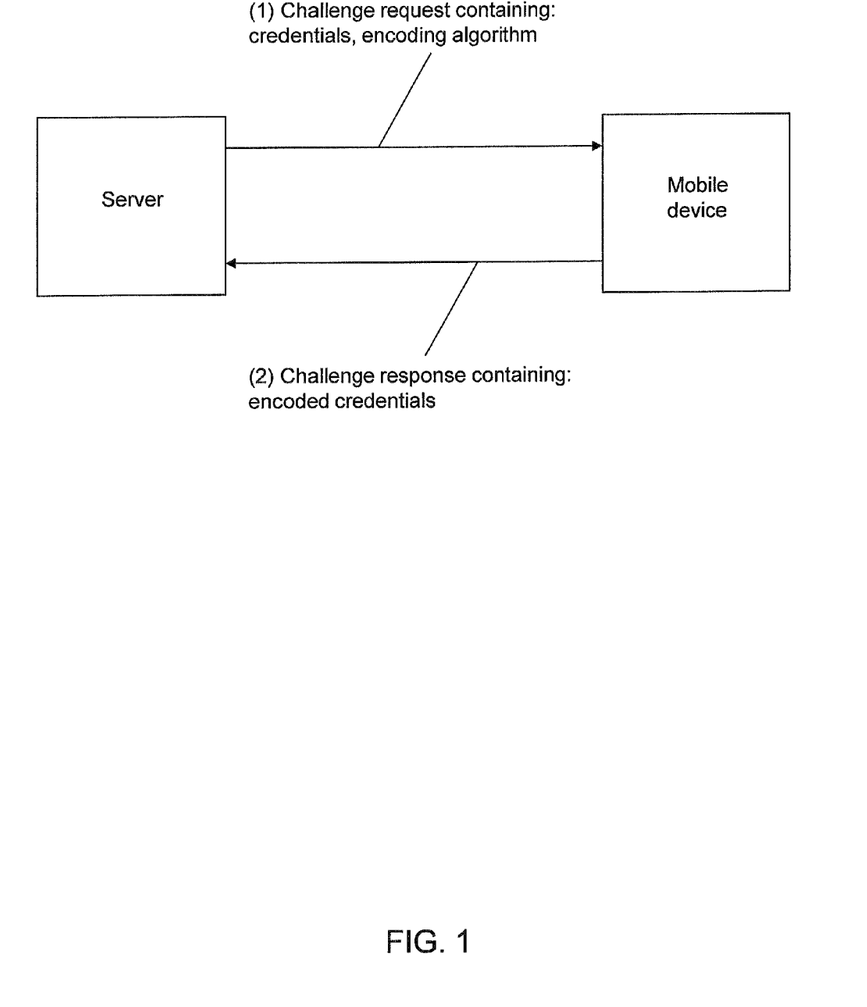
FIG. 1 illustrates a challenge request and a challenge response according to an exemplary embodiment of the present invention.

As shown in FIG. 1, a mobile device and a server are in communication with each other. The initiation of this communication may occur as the result of the mobile device requesting a resource from the server via a middleman. The initiation process will be discussed later. In response to the resource request, the server provides a challenge request to the mobile device (1). The challenge request contains credentials that the server wants from the mobile device as well as an encoding algorithm. The encoding algorithm indicates how the credentials are to be encoded by the mobile device. The encoding algorithm may be described within a descriptor file included in a descriptor/manifest image, for example.

More specifically, the challenge request may ask the mobile device to provide the following as credentials: device model, GPS chip type, processor chip type, etc. As it pertains to encoding, the challenge request may ask the mobile device to provide each of these credentials in a separate image and to group these images as a composite image. Further, with regard to encoding, the challenge request may ask the mobile device to put the credentials in specific areas of the images. For example, the challenge request may require the device model to be put in polygon X in position X of image X, the GPS chip type to be put in polygon Y in position Y of image Y and the processor chip type to be put in polygon Z in position Z of image Z.

Although the above challenge request asks for credentials pertaining to hardware aspects of the mobile device, the credentials are not limited thereto. For example, the requested credentials may include the name of a user, the operating system of the device, the user's password, device attributes, compute node attributes (e.g., MAC address). More than one credential may be put in a single image. The composite image may be animated.

The mobile device may provide a response to the challenge request (2). The challenge response may include the encoded credentials. An example of the challenge response is shown in FIG. 2.

For example, image A may include the device model in polygon 1 in the location of image A specified by the server. Image B may include the GPS chip type in polygon 2 in the location of image B specified by the server. Image C may include the processor chip type in polygon 3 in the location of image C specified by the server. Image D may include the device's build number in polygon 4 in the location of image D specified by the server. The combination of all these images is shown as the composite image in FIG. 2.

Figure 2:
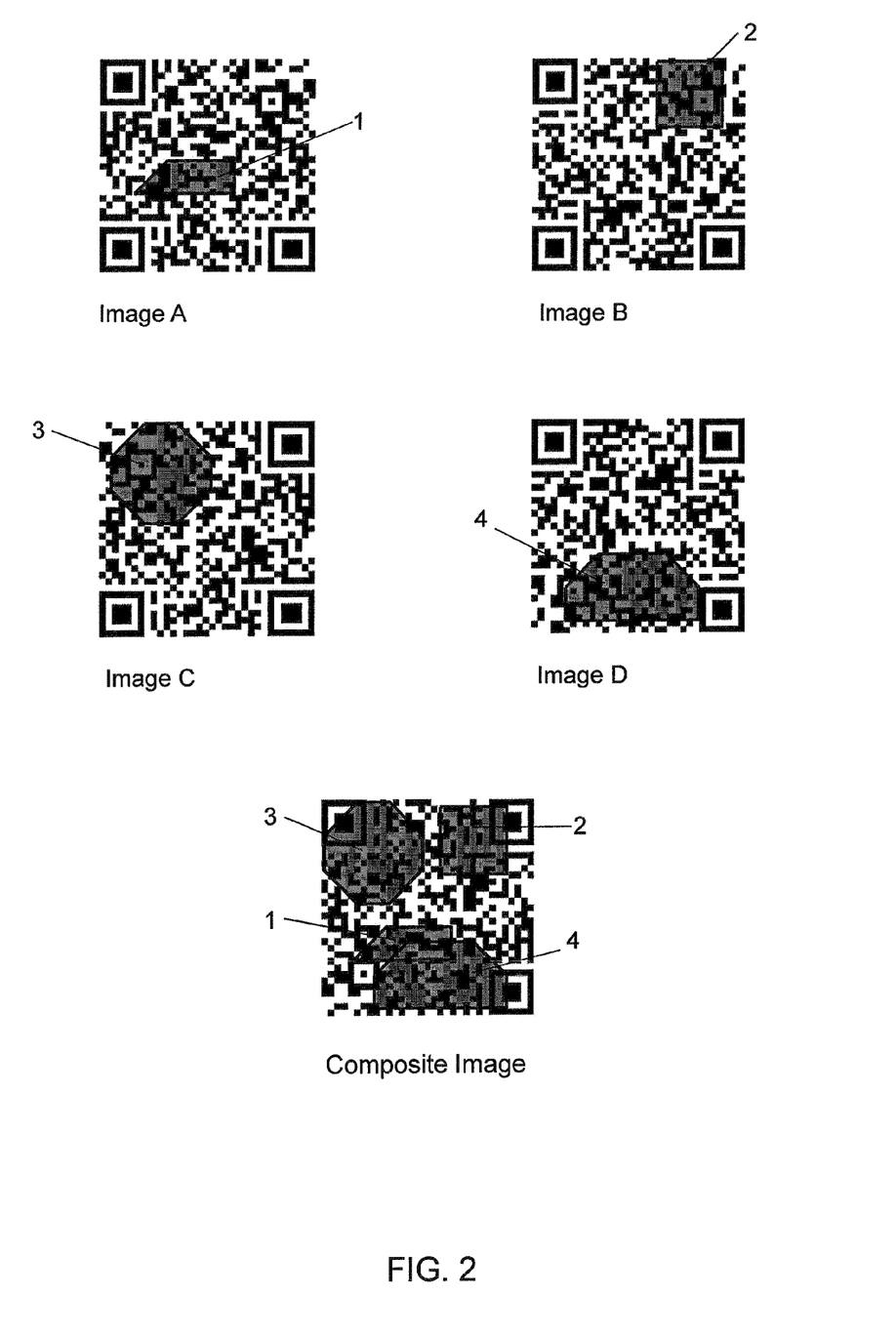
FIG. 2 illustrates images included in a challenge response according to an exemplary embodiment of the present invention.

Although quick response (QR) codes are shown as the images in FIG. 2, other types of barcodes may be used as the images. Further, non-barcode images may be used as well. For example, an image of the mobile device's user may be chosen by the server as the image in which to embed the requested credentials. In this case, the server may tell the mobile device to insert the device type into the right eye of the user, the GPS chip type into the left eye of the user and a password into the mouth of the user.

As can be seen, with the type of challenge request disclosed above, the challenge response encoding permutations are almost infinite.

Upon receipt of the challenge response from the mobile device, the server may authenticate credentials therein and provide the mobile device with the requested resource. Authentication is possible, since the server knows the encoding of the data in the composite image. On the other hand, the authentication may be performed by the middleman. This is will be discussed later.

A method in accordance with an exemplary embodiment of the present invention will now be discussed. More particularly, a method for authentication between a mobile device and a server is disclosed hereafter with reference to FIGS. 3 and 4.

Figure 3:
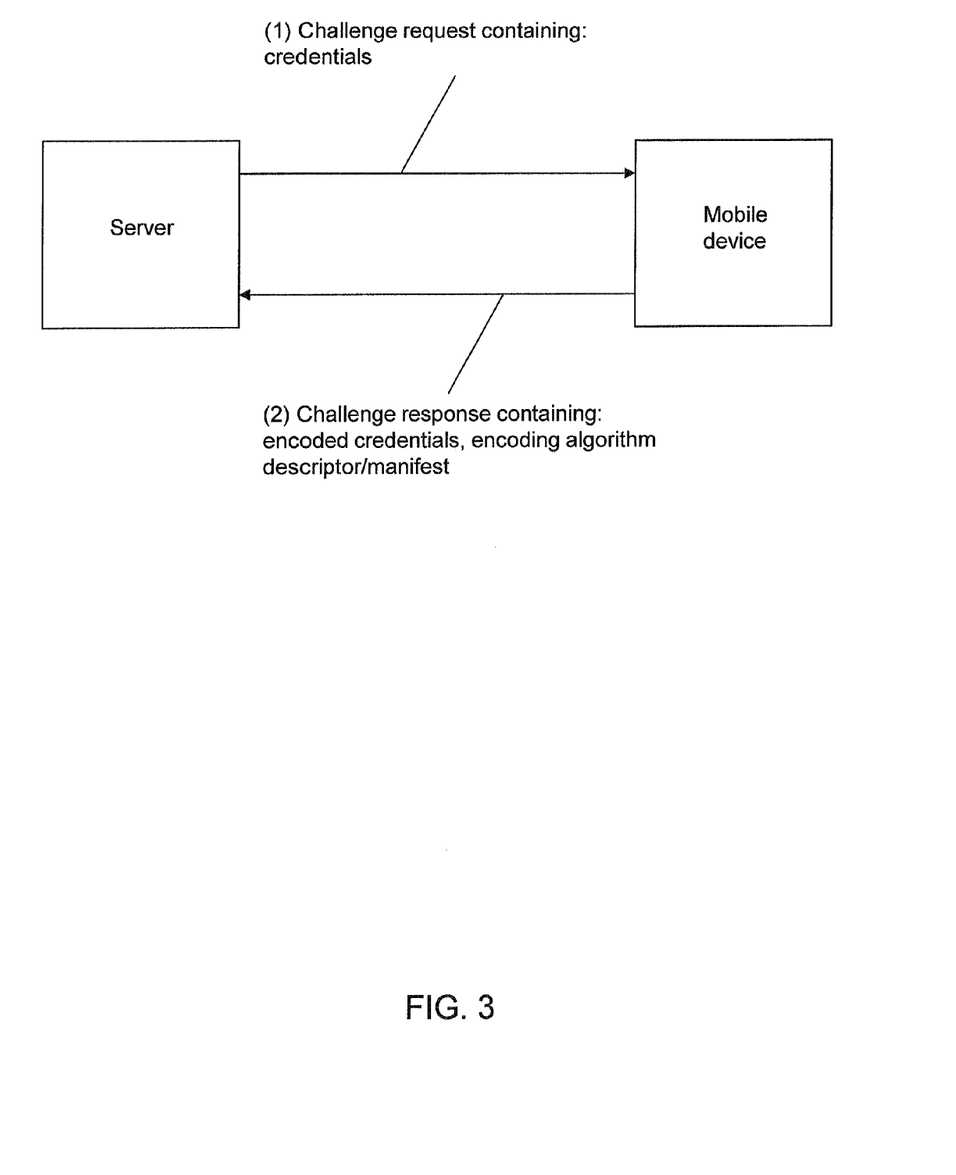
FIG. 3 illustrates a challenge request and a challenge response according to an exemplary embodiment of the present invention.
Figure 4:
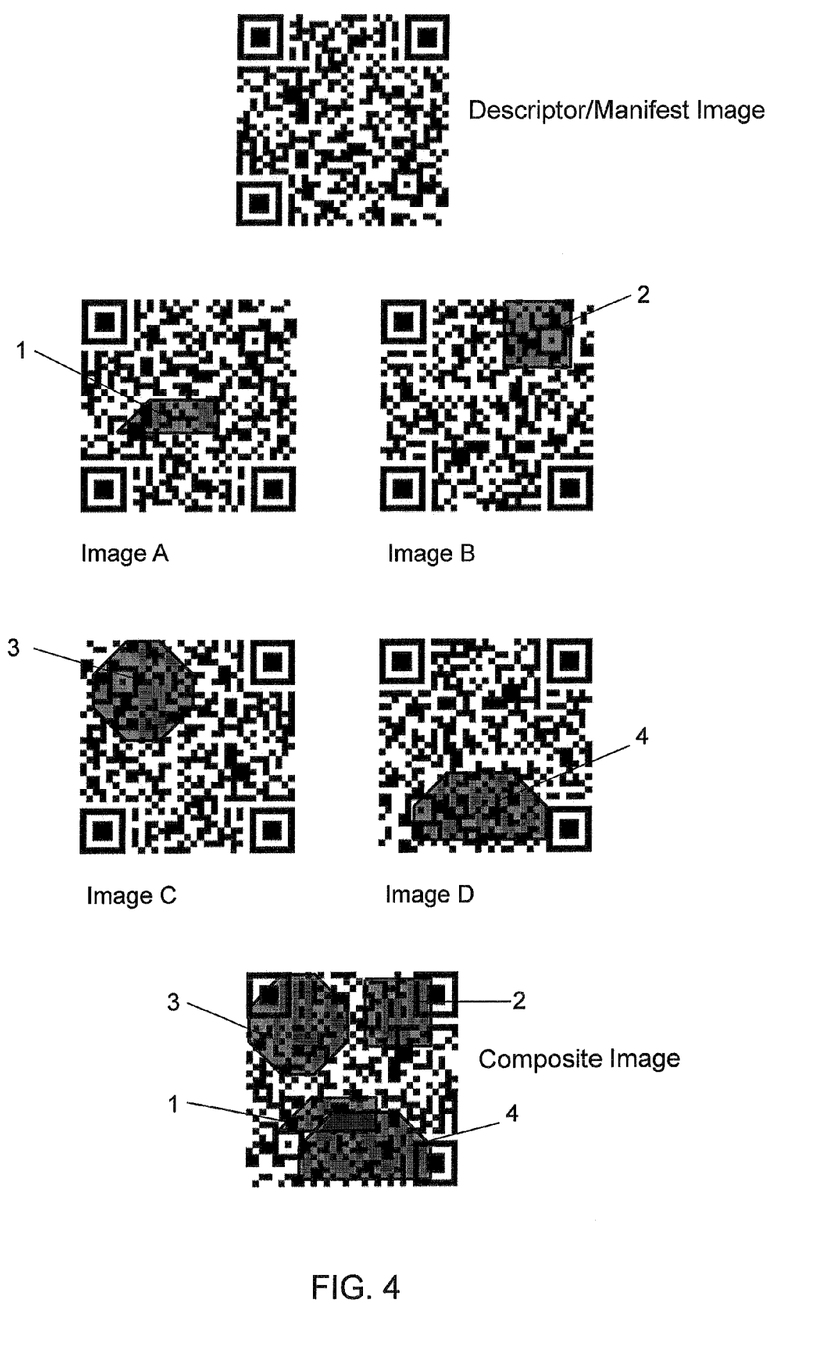
FIG. 4 illustrates images included in a challenge response according to an exemplary embodiment of the present invention.

As shown in FIG. 3, the server provides a challenge request to the mobile device (1). However, unlike that shown in FIG. 1, the challenge request only includes the credentials that the server wants from the mobile device. The mobile device may provide a response to the challenge request (2). Unlike the challenge response shown in FIG. 2, the challenge response may include an encoding algorithm and the encoded credentials. The encoding algorithm may be selected by the mobile device. An example of the challenge response is shown in FIG. 4.

For example, descriptor/manifest image contains the encoding algorithm details. In other words, it identifies the credentials 1-4 and where the credentials are to be found in each of images A-D. In more detail, the encoding algorithm is described within a descriptor file within the descriptor/manifest image. An example descriptor file is shown below.

<descriptor file>
  <challenge>
    <article>device model</article>
    <encoding>Image A, Polygon 1</encoding>
  </challenge>
</descriptor file>

The descriptor file can be obfuscated using any of a plurality of methods that the server is known to understand. For example, in addition to being included in the descriptor/manifest image, it may encrypted or password protected. Further, the descriptor file may not be a file at all; rather, the information included therein may be dependent on the protocol used for communication.

As mentioned above, the user that is requiring access to some resource is faced with a middleman between the user's device and the server. This interaction will now be discussed with references to FIGS. 5 and 6.

Figure 5:
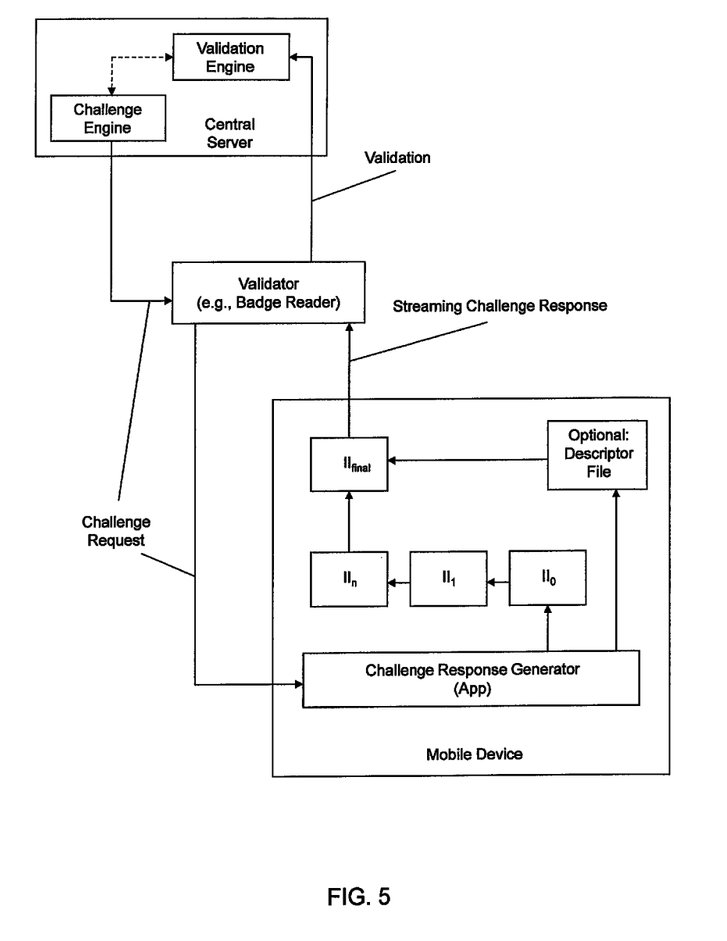
FIG. 5 illustrates an authentication flow between a mobile device, validator and server according to an exemplary embodiment of the present invention.

As shown in FIG. 5, to initiate a request for a resource access, which in turn initiates an authentication process, a mobile device can be bumped or be in close proximity to a validator (e.g., badge reader), when both devices employ near field communication for example. Any approach used to establish radio or non-radio communication between two or more devices may be used in accordance with this invention. The validator may now act as the middleman between the server and the mobile device. In this scenario, the mobile device knows nothing about the server.

The validator obtains a challenge from the server and provides that challenge to the mobile device. The challenge may be generated by a challenge engine of the server. In accordance with an exemplary embodiment of the present invention, the validator may ask the mobile device to stream a series of processed images using a specified algorithm. The number of images to be streamed back and the algorithm applied on each image may be variable each time the validator is engaged.

As shown in FIG. 5, the mobile device has the logic needed (e.g., challenge response generator) to translate the challenge communicated and prepare/present a challenge response. The mobile device also has the logic needed (e.g., descriptor file) to encode its data if no encoding algorithm is provided from the server. The challenge response generator of the mobile device generates a plurality of individual images $II_0 \ldots II_n$ to create a final image $II_{final}$. Here, the II refer to intelligent images such as QR codes. The final image, which may be the generated series of images or a composite (e.g., aggregated images, such as animated images or video) is streamed back to the validator. The validator can perform extraction of data from sent images then send the data to the server, or it can send the raw challenge response to the server for analysis by its validation engine.

In the exemplary embodiment shown and described with reference to FIG. 5, the authentication validator is connected to a centralized server, which initiates the authentication challenge dynamically once a mobile device initiates a resource access request within a certain proximity to the validator. This challenge can be unique and different each time the validator is approached/initiated. As a result, it is highly unlikely to commit identity fraud.

Figure 6:
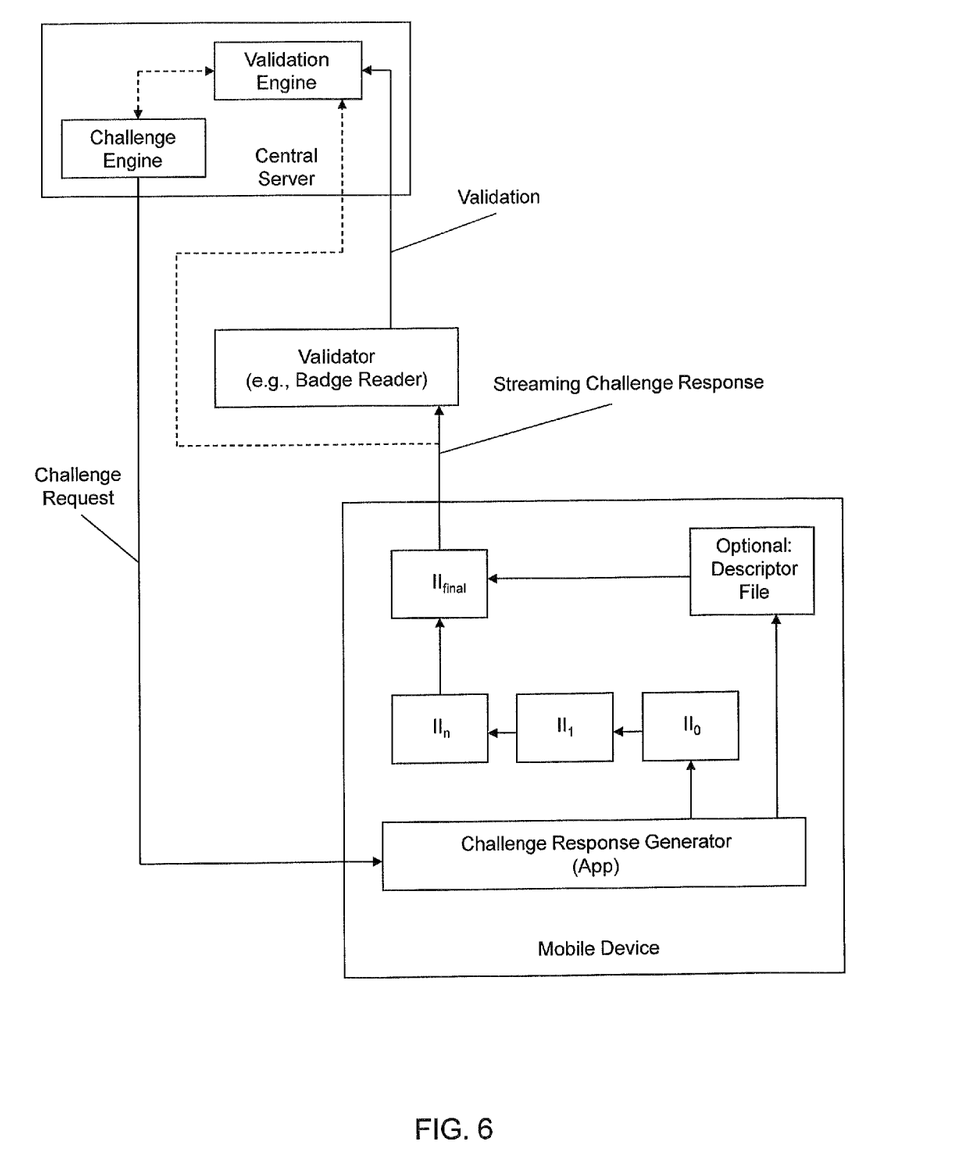
FIG. 6 illustrates an authentication flow between a mobile device, validator and server according to an exemplary embodiment of the present invention.

FIG. 6 shows an embodiment of the invention in which the server communicates the challenge response directly to the mobile device. The validator acts as the middleman only for the challenge response. In the alternative, the challenge response may be sent directly to the server from the mobile device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
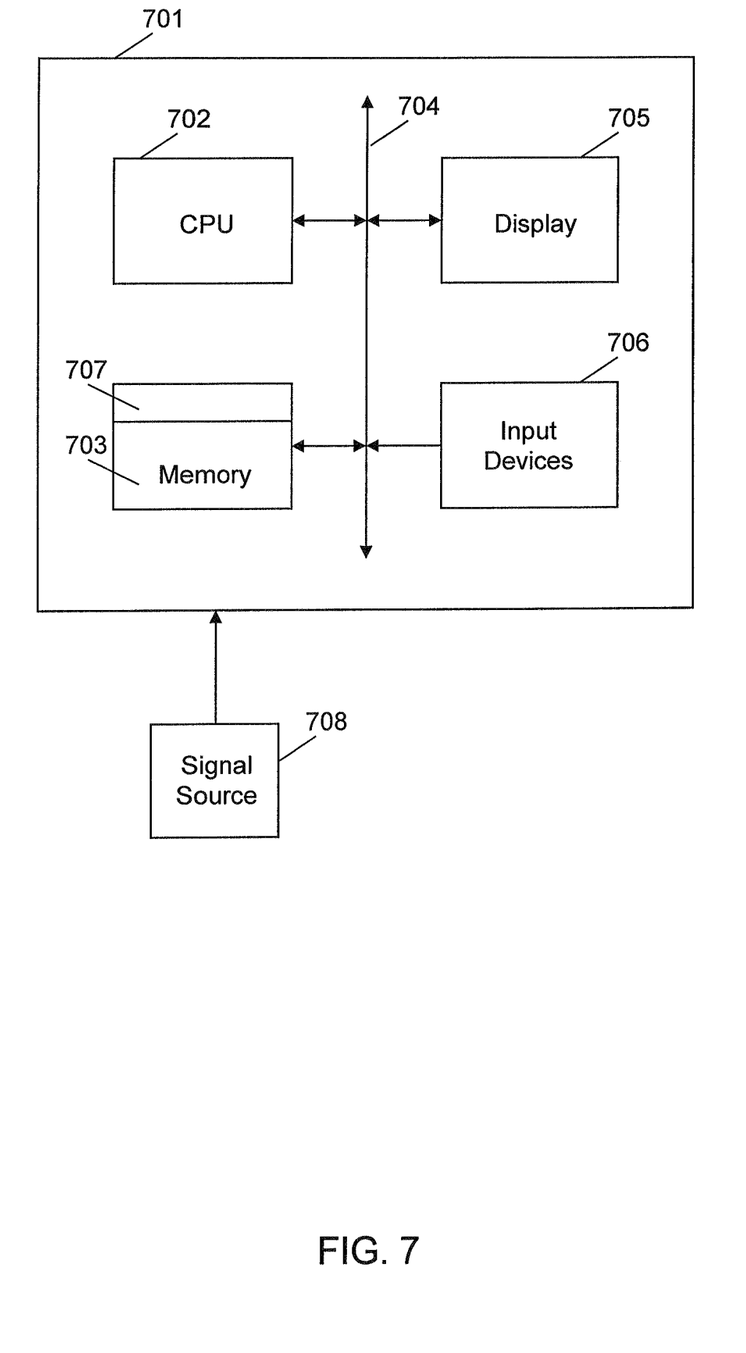
FIG. 7 illustrates an apparatus for implementing an exemplary embodiment of the present invention.

Referring now to FIG. 7, according to an exemplary embodiment of the present invention, a computer system 701 can comprise, inter alia, a CPU 702, a memory 703 and an input/output (I/O) interface 704. The computer system 701 is generally coupled through the I/O interface 704 to a display 705 and various input devices 706 such as a mouse and keyboard. The support circuits can include circuits such as cache, power supplies, clock circuits, and a communications bus. The memory 703 can include RAM, ROM, disk drive, tape drive, etc., or a combination thereof. Exemplary embodiments of present invention may be implemented as a routine 707 stored in memory 703 (e.g., a non-transitory computer-readable storage medium) and executed by the CPU 702 to process the signal from the signal source 708. As such, the computer system 701 is a general-purpose computer system that becomes a specific purpose computer system when executing the routine 707 of the present invention.

The computer platform 701 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
receiving, at a first device, a challenge provided from a second device, wherein the challenge includes an encoding algorithm and a request for credentials from the first device;
outputting, from the first device to the second device, a response to the challenge, wherein the response includes an image, the image including articles of evidence arranged according to the encoding algorithm; and
assembling, at the second device, a key from the articles of evidence, wherein the key permits the first device with access to a desired resource,
wherein the image is a composite image formed of first and second images, the articles of evidence including a first article of evidence found in a polygon arranged at a particular location in the first image and a second article of evidence found in a polygon arranged at a particular location in the second image,
the first article of evidence including one of the requested credentials, the second article of evidence including another one of the requested credentials, the key being assembled by extracting the first and second articles of evidence from the composite image.

2. The method of claim 1, wherein the encoding algorithm identifies where the articles of evidence are to be positioned in the composite image.

3. The method of claim 1, wherein the composite image includes a bar code.

4. The method of claim 1, wherein the first device includes a mobile device.

5. The method of claim 1, wherein the second device includes a server.

6. The method of claim 1, further comprising:
authenticating the first device in response to the challenge response; and
permitting the first device to access the desired resource in response to the authentication of the first device,
wherein the authenticating and permitting are performed using the second device.

7. The method of claim 1, wherein the first device or the second device is a program or a virtual device.

8. The method of claim 1, wherein the composite image includes a quick response code.

9. A method, comprising:
receiving, at a first device, a challenge from a second device, wherein the challenge includes a request for credentials from the first device;

outputting, from the first device to the second device, a response to the challenge, wherein the response includes an encoding algorithm and at least one image that includes articles of evidence arranged according to the encoding algorithm; and assembling, at the second device, a key from the articles of evidence, wherein the key permits the first device with access to desired content, wherein the composite image is formed of first and second images, the articles of evidence including a first article of evidence found in a polygon arranged at a particular location in the first image and a second article of evidence found in a polygon arranged at a particular location in the second image, the first article of evidence including one of the requested credentials, the second article of evidence including another one of the requested credentials.

10. The method of claim 9, wherein the encoding algorithm is included in an image.

11. The method of claim 9, further comprising:
extracting, at the second device, the articles of evidence from the composite image according to the encoding algorithm.

12. A method, comprising:
receiving, at a first device, a challenge request from a second device, wherein the challenge request includes a request for credentials from the first device and an identification of areas where the credentials are to be included in images;

generating, with the first device, first and second images, wherein each image includes at least one article of evidence indicative of at least one of the credentials, and the at least one article of evidence is arranged in the image as indicated by the area corresponding thereto, the articles of evidence including a first article of evidence found in a polygon arranged at a particular location in the first image and a second article of evidence found in a polygon arranged at a particular location in the second image, the first article of evidence including one of the requested credentials, the second article of evidence including another one of the requested credentials;

providing, from the first device, the plurality of images as a composite image to the second device;

providing the composite image to a third device from the second device;

assembling, at the third device, a key using the first and second articles of evidence included in the composite image; and validating, at the third device, the first device using the key.

13. The method of claim 12, wherein prior to the challenge request being sent to the first device from the second device, the challenge request is generated in the third device and provided to the second device based on an initial communication between the first and second devices.

14. The method of claim 12, wherein the first device includes a mobile device, the second device includes a validator and the third device includes a server.

15. A method, comprising:
receiving, at a first device, a challenge request from a second device, wherein the challenge request includes a request for credentials from the first device;

generating, with the first device, a plurality of images, wherein each image includes at least one article of evidence indicative of at least one of the credentials, and the at least one article of evidence is arranged in the image according to an encoding algorithm, the article of evidence including a first article of evidence found in the polygon arranged at a particular location in the first image and a second article of evidence found in a polygon arranged at a particular location in the second image, the first article of evidence including one of the requested credentials, the second article of evidence including another one of the requested credentials;

providing, the first and second images as a composite image to a third device;

providing the composite image to the second device from the third device; and assembling, at the second device, a key using the first and second articles of evidence in the composite image, wherein the key permits the first device with access to desired content.

16. The method of claim 15, wherein the first device includes a mobile device, the second device includes a server and the third device includes a validator.

* * * * *